United States Patent [19]
Tamaki et al.

[11] Patent Number: 5,444,340
[45] Date of Patent: Aug. 22, 1995

[54] CONTROLLING APPARATUS OF MOTOR

[75] Inventors: Satoshi Tamaki, Hirakata; Yasufumi Ikkai, Kobe; Yasuhiro Kondo, Hirakata, all of Japan

[73] Assignee: Matsushita Electric Industrial Co., Ltd., Osaka, Japan

[21] Appl. No.: 307,065

[22] Filed: Sep. 16, 1994

[30] Foreign Application Priority Data

Sep. 17, 1993 [JP] Japan ................... 5-232081

[51] Int. Cl.⁶ .................... H02H 7/08; B60L 3/00
[52] U.S. Cl. .................... 318/139; 318/461; 318/723
[58] Field of Search ............. 318/139, 434, 461, 474, 318/490, 720, 721, 723; 361/23

[56] References Cited

U.S. PATENT DOCUMENTS 4,600,835  7/1986  Ishida et al.
5,128,536  7/1992  Higashi.
5,306,998  4/1994  Nakamura ................... 318/806
5,357,181  10/1994  Muton et al. ................... 318/139

Primary Examiner—Bentsu Ro
Attorney, Agent, or Firm—Wenderoth, Lind & Ponack

[57] ABSTRACT

In a controlling apparatus of a motor, an address generating device generates digital address signals corresponding to a position of a rotor of the motor on the basis of the Z-phase, A-phase, and B-phase signals outputted from an encoder installed in the motor. A sine wave data for driving the motor is readout based on the digital address signal from a waveform memory device to drive the motor in accordance with the sine wave data by a PWM inverter. An abnormality detecting circuit detects agreement/disagreement of a timing level of an output signal of the waveform memory device which is binarized with using zero as a threshold and shifted a predetermined amount from a leading edge or trailing edge thereof and a level of the CS signal. A motor stopping device stops the motor in response to a disagreement detecting signal of the abnormality detecting circuit.

2 Claims, 4 Drawing Sheets

CONTROLLING APPARATUS OF MOTOR

BACKGROUND OF THE INVENTION

The present invention relates to a controlling apparatus of a motor, for example, a synchronous motor as a power source of an electromobile, and more particularly to a controlling apparatus intended for a fail-safe operation in case of a failure of an encoder detecting the rotation of the motor.

The development of electromobiles has been rapidly progressed from the viewpoint of countermeasures against environmental problems, and the power source of an increased number of the recent electromobiles has been replaced with an alternating current motor from a direct current motor because of its advantageous points such as maintenance easiness and the like. Particularly, a synchronous motor using a magnet as a rotor is highly efficient, and therefore eagerly fitted for use in the electromobiles. While the synchronous motor of this kind has conventionally been widely used in the factory automation or industrial field, the basic controlling system of the synchronous motor used in electromobiles is almost the same as in the factory automation or industrial usage. However, because of the undeniable fact that human lives are exposed to a high risk in vehicles, it is necessary to take all possible fail-safe measures.

In the electromobiles, when an output of an accelerator sensor interlocking with an accelerator pedal, that is, a signal of the accelerator sensor increasing, e.g., linearly corresponding to the opening degree of the accelerator, and an output signal of an encoder showing the current rotating speed of a motor and the position of a rotor, etc. are inputted to a control device, the control device detects the difference of a speed command signal which is the accelerator sensor signal and a current speed signal which is the output signal of the encoder, thereby controlling to supply a torque current corresponding to the above difference to the motor. At the same time, a voltage to feed the torque current is written beforehand in a ROM or the like in the form of data of the driving waveform (for instance, sine waves) of the motor. The data of the waveform is read out from the ROM or the like in correspondence to the position of the rotor, then D/A converted and supplied to the motor via a PWM inverter in association with the rotation of the rotor. This is a general controlling system of the electromobiles.

In the above-described arrangement, however, if the encoder fails, it is impossible to form a suitable voltage waveform of the motor corresponding to the rotation of the rotor, and therefore impossible to rotate the motor normally.

SUMMARY OF THE INVENTION

The object of the present invention is therefore to provide a controlling apparatus of a motor whereby the control of a current of a motor is prevented from being turned abnormal due to a failure of an encoder, thereby to avoid running of an electromobile out of control and secure the safety.

A further object of the present invention is to provide a controlling apparatus of a motor which can continue the rotation of the motor so long as a CS signal is normal, particularly, among the failures of an encoder, even when an A-phase and a B-phase signals are abnormal to hinder the detection of the position of a rotor, so that an electromobile can retreat to a safe place without being stopped at the dangerous spot of the failure, thereby securing the safety.

In accomplishing these and other objects, according to one aspect of the present invention, there is provided a controlling apparatus of a motor, comprising:

an encoder which is installed in the motor and outputs Z-phase, A-phase, B-phase, and CS signals;

an address generating means for generating digital address signals corresponding to a position of a rotor of the motor on the basis of the Z-phase, A-phase, and B-phase signals outputted from the encoder;

a speed controlling means for outputting speed controlling/command signals corresponding to a difference between a speed command input and a rotating speed of the motor obtained from the A-phase or B-phase signal outputted from the encoder;

a waveform memory means for storing one cycle of waveform data for driving the motor and reading out the waveform data corresponding to the position of the rotor of the motor while the digital address signal outputted from the address generating means is used as an address input;

a multiplying D/A converter means for adding the speed controlling/command signal outputted from the speed controlling means to the waveform data outputted from the waveform memory means and performing a D/A conversion to the adding result;

a current controlling circuit which outputs an error signal between an output signal of the multiplying D/A converter means and a detecting signal of a load current flowing in the motor;

a PWM controlling circuit which generates a pulse width modulation signal in accordance with an output signal of the current controlling circuit;

a PWM inverter for driving the motor in accordance with an output signal of the PWM controlling circuit;

an agreement/disagreement detecting means for detecting agreement/disagreement of a timing level of an output signal of the waveform memory means which is binarized with using zero as a threshold and shifted a predetermined amount from a leading edge or trailing edge thereof and a level of the CS signal; and a motor stopping means for stopping the motor in response to a disagreement detecting signal of the agreement/disagreement detecting means.

According to another aspect of the present invention, there is provided A controlling apparatus of a motor, comprising:

an encoder which is installed in the motor and outputs Z-phase, A-phase, B-phase, and CS signals;

an address generating means for generating digital address signals corresponding to a position of a rotor of the motor on the basis of the Z-phase, A-phase, and B-phase signals outputted from the encoder;

a speed controlling means for outputting speed controlling/command signals corresponding to a difference between a speed command input and a rotating speed of the motor obtained from the A-phase or B-phase signal outputted from the encoder;

a waveform memory means for storing one cycle of waveform data for driving the motor and reading out the waveform data corresponding to the position of the rotor of the motor while the digital address signal outputted from the address generating means is used as an address input;

a multiplying D/A converter means for adding the speed controlling/command signal outputted from the speed controlling means to the waveform data outputted from the waveform memory means and performing a D/A conversion to the adding result;

a current controlling circuit which outputs an error signal between an output signal of the multiplying D/A converter means and a detecting signal of a load current flowing in the motor;

a PWM controlling circuit which generates a pulse width modulation signal in accordance with an output signal of the current controlling circuit;

a PWM inverter for driving the motor in accordance with an output signal of the PWM controlling circuit;

an agreement/disagreement detecting means for detecting agreement/disagreement of a timing level of an output signal of the waveform memory means which is binarized with using zero as a threshold and shifted a predetermined amount from a leading edge or trailing edge thereof and a level of the CS signal; and a rectangular wave driving/controlling means for stopping supply of the output signal from the multiplying D/A converter means to the current controlling circuit in response to a disagreement detecting signal of the agreement/disagreement detecting means, supplying the CS signal to the current controlling circuit, thereby driving the motor with a rectangular wave voltage.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
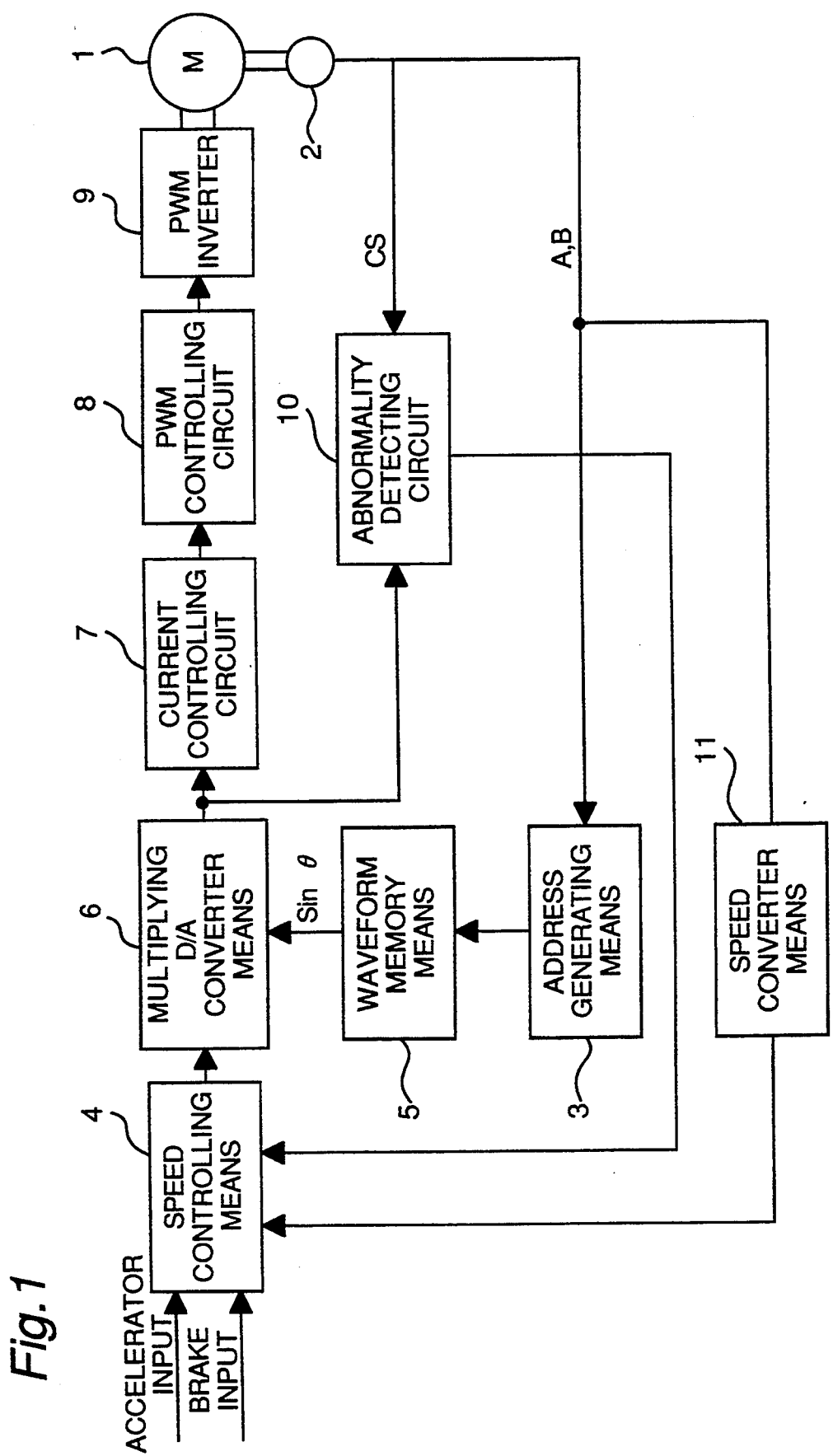
FIG. 1 is a block diagram showing the constitution of a motor controlling apparatus according to a first embodiment of the present invention.

Before the description of the present invention proceeds, it is to be noted that like parts are designated by like reference numerals throughout the accompanying drawings.

A first embodiment of the present invention will be described with reference to FIGS. 1 and 2.

FIG. 1 is a circuit diagram of a motor controlling apparatus according to a first embodiment of the present invention, in which reference numeral 1 indicates a motor, for instance, a synchronous motor as the driving source of an electromobile.

An encoder 2 installed in the motor 1 outputs Z-phase, A-phase, B-phase, and CS signals, detecting the position of magnetic poles and the rotating position of a rotor.

An address generating means 3 generates digital address signals corresponding to the position of the rotor of the motor 1 on the basis of the Z-phase, A-phase, and B-phase signals outputted from the encoder 2.

A speed controlling means 4 is constituted of a CPU or the like outputting a command signal to control the speed of the motor 1 in correspondence to the difference of the input from the accelerator or brake and the rotating speed of the motor 1 detected from the A-phase or B-phase signals outputted from the encoder 2.

A waveform memory means 5 is constituted of a ROM or the like which stores the waveform data of one cycle for driving the motor 1, and which reads out the waveform data $\sin\theta$ corresponding to the position of the rotor of the motor 1 while a digital address signal outputted from the address generating means 3 is served as an address input thereof.

A multiplying D/A converter means 6 adds the speed controlling/command signal outputted from the speed controlling means 4 to the waveform data for the driving of the motor 1 outputted from the waveform memory means 5 and, processes the adding result through the D/A conversion.

A current controlling circuit 7 generates an error signal between the output signal of the multiplying D/A converter means 6 and a detecting signal obtained by a current transformer or the like (not shown) which transforms a load current running in the motor 1.

A pulse width modulation (referred to as PWM hereinafter) controlling circuit 8 generates a PWM signal corresponding to the output signal of the current controlling circuit 7.

A PWM inverter 9 drives the motor 1 in accordance with the output signal from the PWM controlling circuit 8.

An abnormality detecting circuit 10 is constituted of an agreement/disagreement detecting means for detecting the agreement/disagreement of the timing level of a binarized signal obtained by binarizing the output signal of the waveform memory means 5 when zero is used as a threshold and shifted a predetermined amount from the leading edge or trailing edge thereof and the level of the CS signal, and a motor stopping means for stopping the motor 1 in response to a disagreement detecting signal of the agreement/disagreement detecting means.

A speed converter means 11 converts the output signal of the encoder 2 (A-phase and B-phase signals) to speed signals and outputs the speed signals to the speed controlling means 4.

The output signal of the encoder 2 will be described below.

The CS signal output from the encoder 2 is a commutation sensor signal indicating the detection of the position of magnetic poles of the rotor of the synchronous motor to determine to which coils the electricity is supplied.

Thereafter, pulse trains of two phases shifted 90° to a reference pulse (Z-phase signal; one pulse per one rotation of 360°), that is, A-phase and B-phase signals are outputted as signals detecting the rotating position of the rotor. The encoder 2 thus detects the rotating direction of the rotor from the shifts of the phases, and detects also the rotating angle of the rotor by counting the pulse trains of the A-phase or B-phase signal.

The rotating angle and the rotating speed are detected in a manner as will be detailed hereinbelow.

For example, supposing that 1000 pulses are generated per one rotation when the A-phase and B-phase signals only at the rise time are counted, the 500th pulse counted from the Z-phase signal corresponds to the fact that the rotor is at the 180° phase. The speed of the motor 1 is detected by counting the number of pulses of the A-phase or B-phase signal within a fixed time interval. For instance, if 2000 pulses are counted in one second, the motor 1 is rotated twice in one second, i.e., at 120 rpm.

The CS signal may be considered to be unnecessary if Z-phase, A-phase, and B-phase signals are provided by the reason that the rotating angle of the rotor is detected from the Z-phase, A-phase, and B-phase signals. However, the Z-phase, A-phase, and B-phase signals are not effectively used until the Z-phase signal serving as a reference is inputted. Therefore, the current to the coils is commutated in correspondence to the output of the CS signal until the Z-phase signal is inputted. The timing to commutate the current to the motor 1 is produced based on the Z-phase signal as the reference after the Z-phase signal is inputted.

The operation of the motor controlling apparatus in the above constitution will be discussed below.

A digital address signal corresponding to the position of the rotor of the motor 1 is generated by the address generating means 3 based on the output signal from the encoder 2 installed in the motor 1. At the same time, a speed controlling/command signal is outputted corresponding to the difference of the input of the speed command from the speed controlling means 4 and the rotating speed of the motor 1 obtained from the A-phase and B-phase signals outputted from the encoder 2.

The digital address signal outputted from the address generating means 3 is supplied to the waveform memory means 5. As a result, the waveform data of sine waves, e.g., U-phase or V-phase waves for driving the motor 1 is read out from the waveform memory means 5 corresponding to the actual position of the rotor.

Further, the speed controlling/command signal of the speed controlling means 4 is added to the waveform data of the U-phase or W-phase waves outputted from the waveform memory means 5 at the multiplying D/A converter means 6, the result of which is D/A converted. Accordingly, a U-phase or W-phase output signal is generated from the multiplying D/A converter means 6 to the current controlling circuit 7.

In the current controlling circuit 7, U-phase, V-phase, and W-phase current command signals (actual command values of the U-phase, V-phase, and W-phase current) are generated on the basis of the U-phase and W-phase output signals and the detecting signal of the actually-running load current in the motor 1. The PWM controlling circuit 8 in turn generates a PWM signal corresponding to the output signal of the current controlling circuit 7, in other words, current-voltage conversion is carried out. The motor 1 is hence driven in accordance with the output signal of the PWM controlling circuit 8 by the PWM inverter 9.

The agreement/disagreement of the timing level of the output signal of the waveform memory means 5 which is binarized with using zero as a threshold and shifted a predetermined amount from the leading edge or trailing edge thereof to the level of the CS signal ism-detected by the agreement/disagreement detecting means of the abnormality detecting circuit 10. The motor 1 is stopped by the motor stopping means in response to the disagreement detecting signal of the agreement/disagreement detecting means. Accordingly, the abnormality of the signal of the encoder 2 is easily detected, thereby avoiding the abnormality in the control of the current of the motor 1 due to the abnormality of the output data of the waveform memory means 5 consequent to the failure of the encoder 2, especially, abnormality of the A-phase and B-phase signals.

The operation of the above abnormality detecting circuit 10 will now be discussed more in detail.

The encoder 2 directly coupled to the motor 1 generates, as described before, Z-phase, A-phase, B-phase, CS (CS1-CS3) signals and the like signals.

The Z-phase signal having 1 rps pulse (one pulse per one cycle), and the A-phase and B-phase signals having 1000 rps (1000 pulses per one cycle) are outputted as the rotor rotates. The CS (CS1-CS3) signal generates pulses of the number coincident to that of the poles of the motor, namely, 2 rps in the embodiment. The phase difference of the A-phase and B-phase signals is 90°.

In the present motor controlling apparatus, for instance, the number of pulses of the A-phase signal (or B-phase signal) is counted based on the Z-phase signal as a reference, and the digital address corresponding to the angle of the rotor of the motor 1 is inputted to the waveform memory means 5 formed of a ROM. The waveform memory means 5 outputs sine waves, and by the multiplying D/A converter means 6, the outputted sine waves are integrated by the speed command value of the speed controlling means 4 which is a CPU, and then the converter means 6 outputs the integrated sine waves in the analog form. The state at this time is as shown in FIG. 2. There are sequentially indicated in FIG. 2 a Z-phase signal, an inverted Z-phase signal, an A-phase signal, an inverted A-phase signal, a B-phase signal, an inverted B-phase signal, a CS1 signal, an inverted CS1 signal, a CS2 signal, an inverted CS2 signal, a CS3 signal, an inverted CS3 signal, output signals of each of U-phase, V-phase, and W-phase of the waveform memory means 5.

Figure 2:
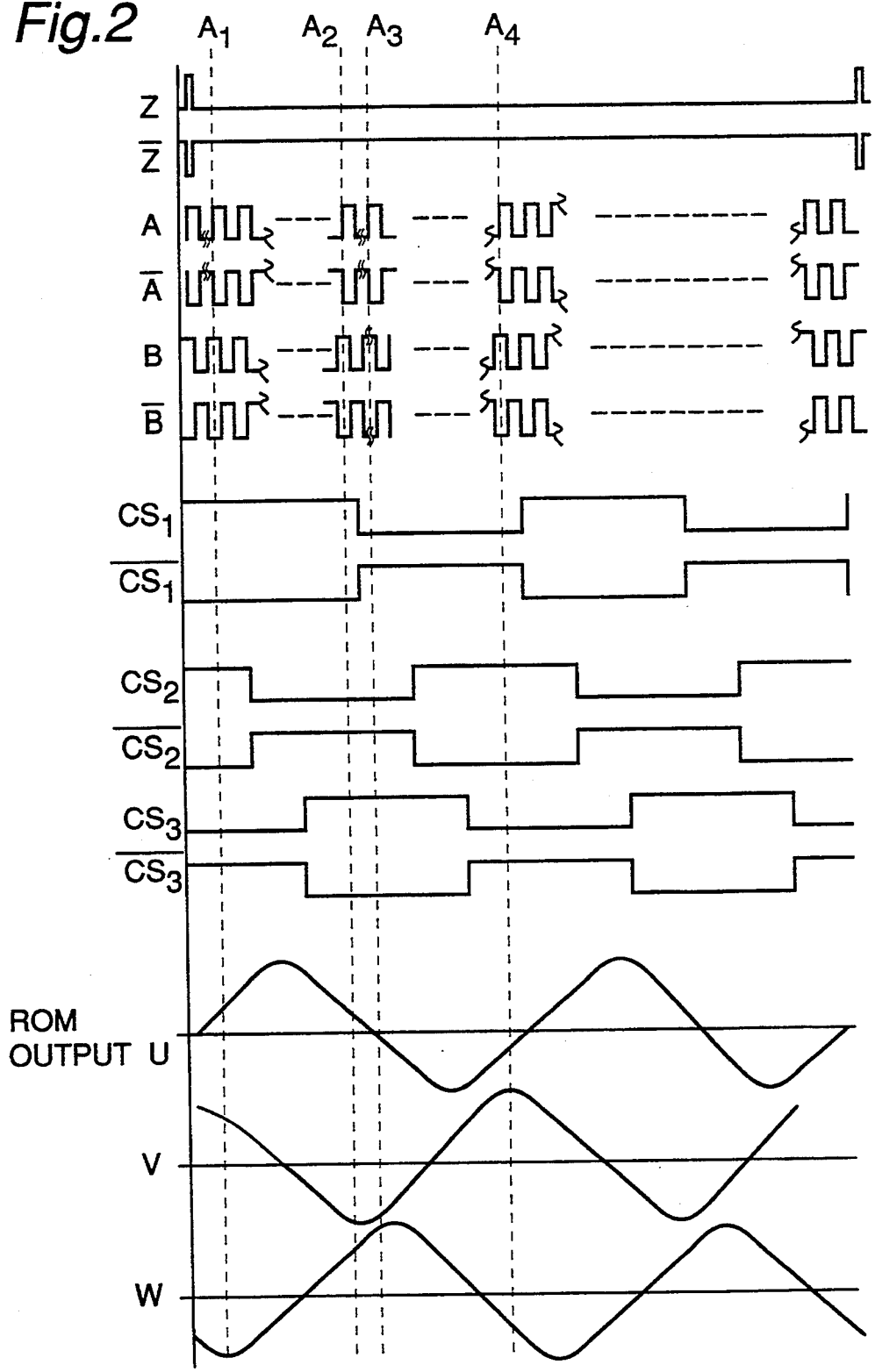
FIG. 2 is a time chart of each part of the motor controlling apparatus of FIG. 1.

In FIG. 2, when the U-phase sine wave is not larger than 0, it is a normal state, with the CS1 signal always in the high level. If the U-phase sine wave is not larger than 0, the CS1 signal is in the low level.

When the output signal from the waveform memory means 5 at a rise point A1 of the 5th pulse of the A-phase signal and at a rise point A2 of the 245th pulse of the same signal since the CS1 signal is turned into the high level state is analog-converted and binarized while zero is a threshold, and if the binarized signal and the CS1 signal are both in the high level, it is decided by the abnormality detecting means 10 that there is no abnormality. If the binarized signal and the CS1 signal are in the low level at a rise point A3 of the 255th pulse of the A-phase signal and at a rise point A4 of the 495th pulse of the A-phase signal, it is decided not to be abnormal. In other words, an abnormality is detected if the two signals are different in the level theoretically.

In the embodiment, since the A-phase signal generates 1000 pulses per one rotation of the rotor, the rotating angle of the rotor per one pulse of the A-phase signal is 0.36°, and that of five pulses is 1.8°. Therefore, it is abnormal if the above binarized signal is shifted 1.8° or larger from the CS1 signal.

In the case where an abnormality is detected, a stopping signal to stop the motor 1 is outputted from the abnormality detecting circuit 10, and transmitted to the current controlling circuit 7. The motor 1 is stopped and eventually the system is stopped.

The disconnection of a signal line of the encoder, etc. is handled separately.

According to the embodiment of the motor controlling apparatus described hereinabove, the agreement/disagreement of the level of the binarized output signal of the waveform memory means 5 shifted a predetermined amount from the leading edge or trailing edge to the level of the CS signal is detected, and the motor 1 is stopped in the presence of a disagreement detecting signal. Therefore, the abnormality of the signal of the encoder 2 can be detected easily, whereby the abnormality in the control of the current of the motor 1 resulting from the abnormality of the output data of the waveform memory means 5 caused by the failure of the encoder 2, particularly, the abnormality of the A-phase and B-phase signals can be prevented, so that the electromobile is prevented from running out of control, ensuring the safety.

Figure 3:
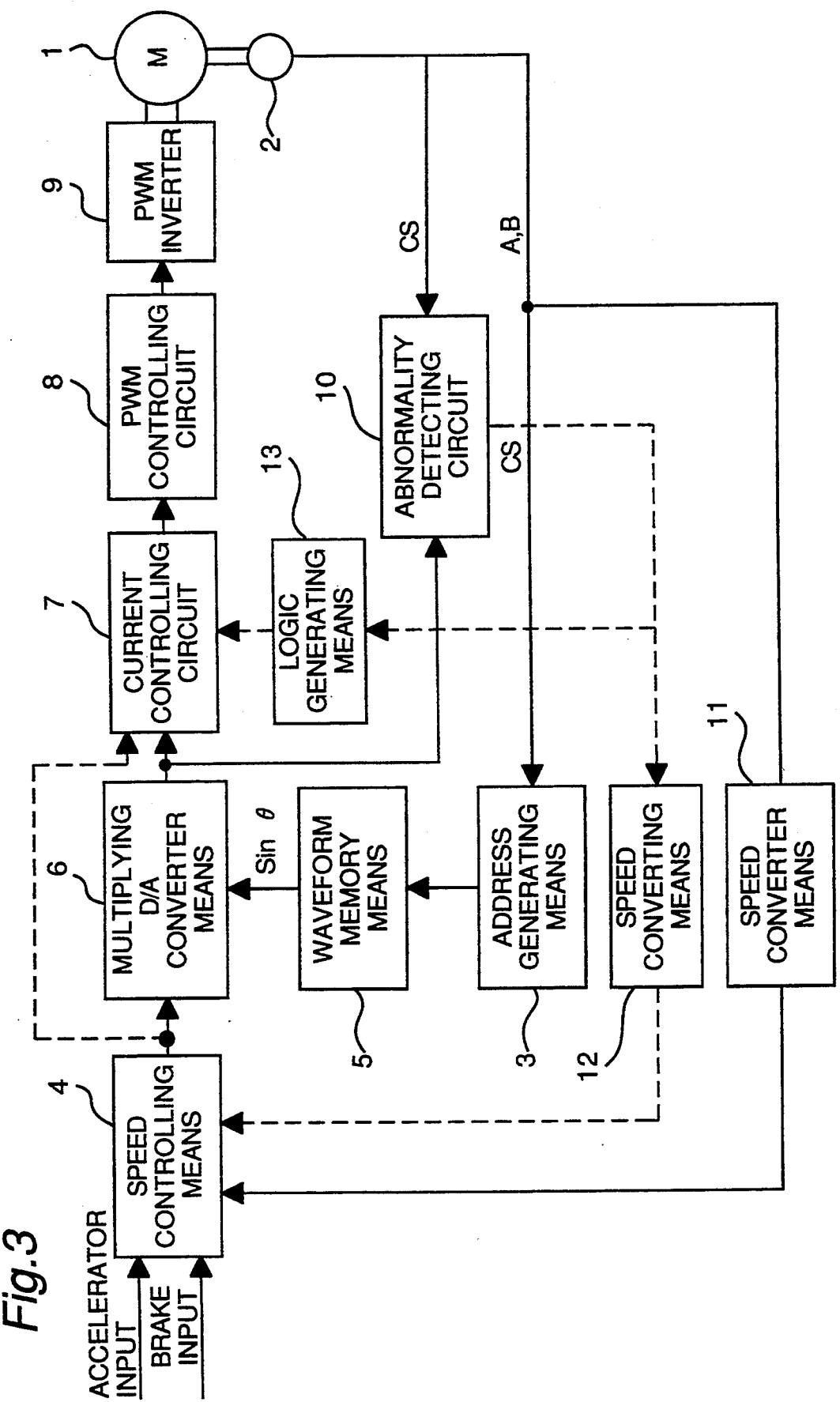
FIG. 3 is a block diagram showing the constitution of a motor controlling apparatus according to a second embodiment of the present invention.
Figure 4:
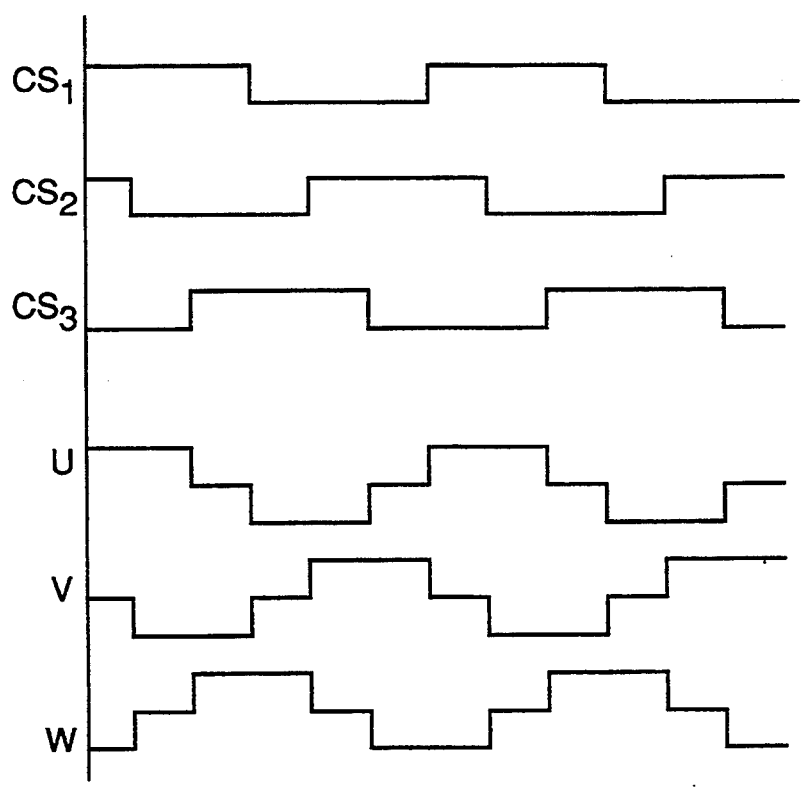
FIG. 4 is a time chart of each part of the motor controlling apparatus of FIG. 3.

A second embodiment of the present invention will be depicted with reference to FIGS. 3 and 4.

According to the second embodiment, the supply of the output signal from the multiplying D/A converter means 6 to the current controlling circuit 7 is stopped in response to a disagreement detecting signal of the agreement/disagreement detecting means, and the CS signal is supplied to the current controlling circuit 7 after logically processed and transformed at a logic generating means 13 to a motor-driving waveform, so that the motor 1 is driven with a rectangular wave voltage by a rectangular wave driving/controlling means. The other constitution than this rectangular wave driving/controlling means in place of the motor stopping means of the first embodiment is the same as in FIG. 1.

Although the CS signal is sent to the current controlling circuit 7 from the abnormality detecting circuit 10 so as to drive the motor 1 with a rectangular wave voltage, the CS signal is fed also to a speed converting means 12. The speed converting means 12 detects the rotating speed of the motor 1 based on the CS signal and outputs a speed detecting signal to the speed controlling means 4. Consequently, similar to the normal case, the speed controlling means 4 feeds the signal to the current controlling circuit 7, so that the speed is controlled on the basis of the inputs from the accelerator, brake, and output signal of the speed converting means 12.

The operation in the circuit structure after the current controlling circuit 7 is carried out in the same manner as at the normal time.

In the motor controlling apparatus of the second embodiment, the agreement/disagreement detecting means detects the agreement/disagreement of the level between the output signal of the waveform memory means 5 which is binarized with using zero as a threshold and shifted a predetermined amount from the leading edge or trailing edge, and the CS signal. The rectangular wave driving/controlling means stops to supply the output signal from the multiplying D/A converter means 6 to the current controlling circuit 7 in accordance with a disagreement detecting signal of the agreement/disagreement detecting means, but the CS signal is supplied to the current controlling circuit 7. Accordingly, the motor 1 is driven with a rectangular wave voltage. In the manner as above, although the abnormality of the signal of the encoder 2 is easily detected, the rotation of the motor 1 is continued so long as the CS signal is normal even if the encoder 2 fails, particularly, even when the A-phase and B-phase signals become abnormal to hinder the detection of the position of the rotor.

As described hereinabove, the driving waveform is switched against an inconvenience that the A-phase and B-phase signals are defective due to the failure of the encoder 2 and then make it impossible to generate the sine wave data of the normal time, thereby to hinder the motor 1 from driving with a sine wave voltage. When it is detected by the similar manner to the first embodiment that the A-phase and B-phase signals are turned defective, in the second embodiment, the motor 1 is promptly switched to be driven by the CS signal of the rectangular waveform. The waveform of the CS signal (CS1-CS3) of the encoder 2 and the U-phase, V-phase, and W-phase signals of the motor 1 at this time are indicated in FIG. 4.

Although the motor 1 is vibrated more or less when the driving waveform is switched, it does not interfere with enough rotation of the motor 1.

In the motor controlling apparatus of the second embodiment, the agreement/disagreement of the level of the output signal from the waveform memory means 5 which is binarized with using zero as a threshold and shifted a predetermined amount from the leading edge or trailing edge to the level of the CS signal is detected. The output signal of the multiplying D/A converter means 6 is stopped to be supplied to the current controlling circuit 7 in the presence of a disagreement detecting signal. On the contrary, the CS signal is supplied to the current controlling circuit 7, thus driving the motor 1 with a rectangular wave voltage. Accordingly, the abnormality of the signal of the encoder 2 can be detected easily, and the rotation of the motor 1 is continued so long as the CS signal is normal even when the encoder 2 fails, particularly, when the A-phase and B-phase signals are abnormal to hinder the detection of the position of the rotor. Even if a failure is brought about at a dangerous place, the electromobile can be retreated to a safe place without being stopped at the spot or moved to a repair plant, that is, safety is secured.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A controlling apparatus of a motor, comprising:
an encoder which is installed in the motor and outputs Z-phase, A-phase, B-phase, and CS signals;
an address generating means for generating digital address signals corresponding to a position of a rotor of the motor on the basis of the Z-phase, A-phase, and B-phase signals outputted from the encoder;
a speed controlling means for outputting speed controlling/command signals corresponding to a difference between a speed command input and a rotating speed of the motor obtained from the A-phase or B-phase signal outputted from the encoder;
a waveform memory means for storing one cycle of waveform data for driving the motor and reading out the waveform data corresponding to the position of the rotor of the motor while the digital address signal outputted from the address generating means is used as an address input;
a multiplying D/A converter means for adding the speed controlling/command signal outputted from the speed controlling means to the waveform data outputted from the waveform memory means and performing a D/A conversion to the adding result;

a current controlling circuit which outputs an error signal between an output signal of the multiplying D/A converter means and a detecting signal of a load current flowing in the motor;

a PWM controlling circuit which generates a pulse width modulation signal in accordance with an output signal of the current controlling circuit;

a PWM inverter for driving the motor in accordance with an output signal of the PWM controlling circuit;

an agreement/disagreement detecting means for detecting agreement/disagreement of a timing level of an output signal of the waveform memory means which is binarized with using zero as a threshold and shifted a predetermined amount from a leading edge or trailing edge thereof and a level of the CS signal; and a motor stopping means for stopping the motor in response to a disagreement detecting signal of the agreement/disagreement detecting means.

2. A controlling apparatus of a motor, comprising:

an encoder which is installed in the motor and outputs Z-phase, A-phase, B-phase, and CS signals;

an address generating means for generating digital address signals corresponding to a position of a rotor of the motor on the basis of the Z-phase, A-phase, and B-phase signals outputted from the encoder;

a speed controlling means for outputting speed controlling/command signals corresponding to a difference between a speed command input and a rotating speed of the motor obtained from the A-phase or B-phase signal outputted from the encoder;

a waveform memory means for storing one cycle of waveform data for driving the motor and reading out the waveform data corresponding to the position of the rotor of the motor while the digital address signal outputted from the address generating means is used as an address input;

a multiplying D/A converter means for adding the speed controlling/command signal outputted from the speed controlling means to the waveform data outputted from the waveform memory means and performing a D/A conversion to the adding result;

a current controlling circuit which outputs an error signal between an output signal of the multiplying D/A converter means and a detecting signal of a load current flowing in the motor;

a PWM controlling circuit which generates a pulse width modulation signal in accordance with an output signal of the current controlling circuit;

a PWM inverter for driving the motor in accordance with an output signal of the PWM controlling circuit;

an agreement/disagreement detecting means for detecting agreement/disagreement of a timing level of an output signal of the waveform memory means which is binarized with using zero as a threshold and shifted a predetermined amount from a leading edge or trailing edge thereof and a level of the CS signal; and a rectangular wave driving/controlling means for stopping supply of the output signal from the multiplying D/A converter means to the current controlling circuit in response to a disagreement detecting signal of the agreement/disagreement detecting means, supplying the CS signal to the current controlling circuit, thereby driving the motor with a rectangular wave voltage.

* * * * *